No. 761,873. PATENTED JUNE 7, 1904.
S. E. BURKE.
AUTOMOBILE CLIMBER.
APPLICATION FILED AUG. 3, 1903.
NO MODEL.
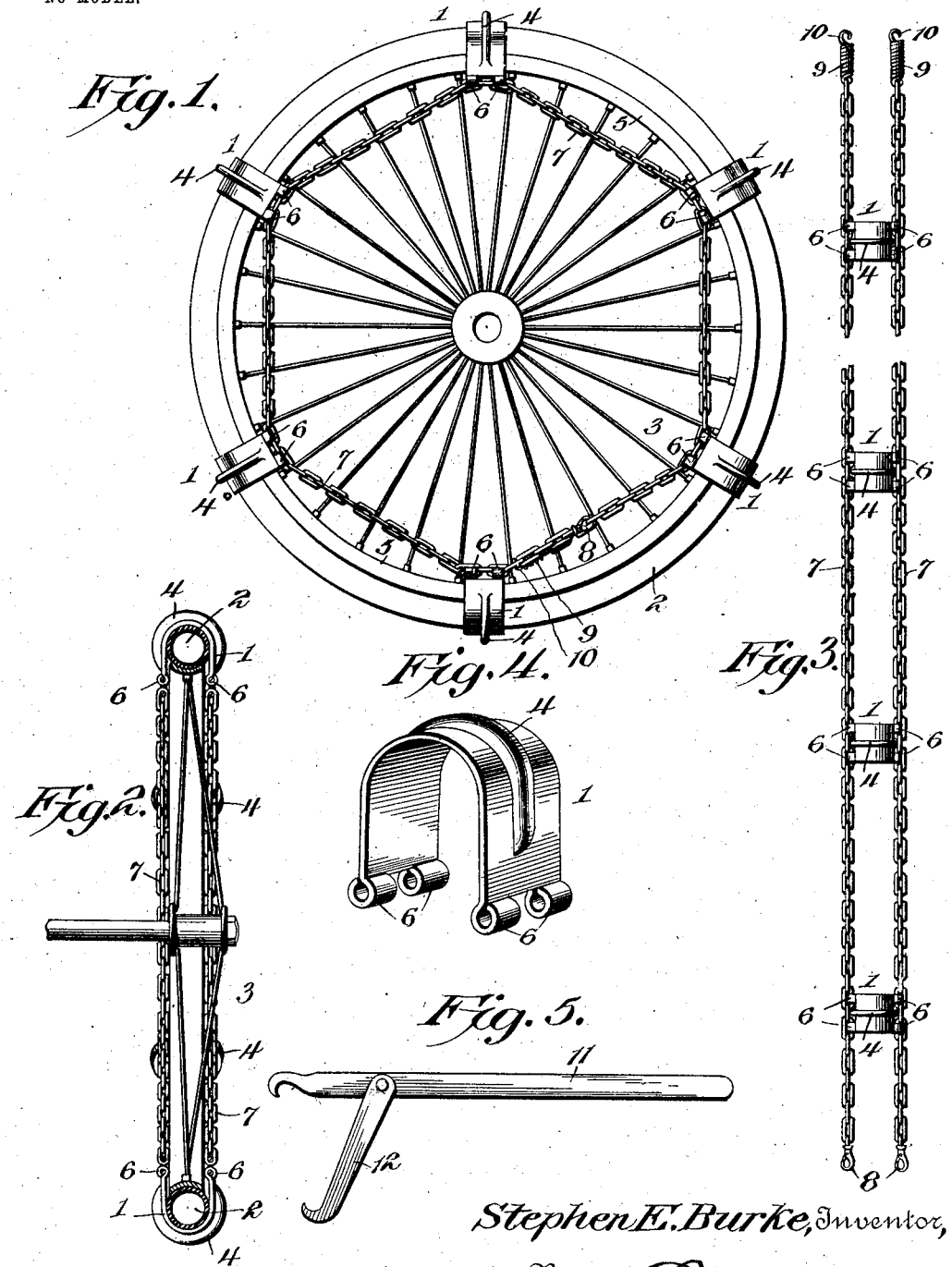
Stephen E. Burke, Inventor,
Witnesses No. 761,873. Patented June 7, 1904.

UNITED STATES PATENT OFFICE.

STEPHEN E. BURKE, OF EDON, OHIO.

AUTOMOBILE-CLIMBER.

SPECIFICATION forming part of Letters Patent No. 761,873, dated June 7, 1904.

Application filed August 3, 1903. Serial No. 168,074. (No model.)

*To all whom it may concern:*

Be it known that I, STEPHEN E. BURKE, a citizen of the United States, residing at Edon, in the county of Williams and State of Ohio, have invented a new and useful Automobile-Climber, of which the following is a specification.

The invention relates to an attachment for horseless vehicles for enabling the wheels thereof to grip the ground firmly and for preventing slipping when traveling over slippery roads and ascending or descending steep inclines.

The object of the present invention is to provide a simple, inexpensive, and efficient attachment for automobiles and other horseless vehicles adapted to be compactly carried within such a vehicle and capable of being quickly applied to and removed from the wheels thereof and of effectually preventing a vehicle from slipping when traveling over muddy roads, ascending or descending steep inclines, and when running on ice and snow.

The invention also has for its object to provide a device of this character which will not necessitate any alteration in the construction of a vehicle-wheel or mar the finish thereof and which will be cushioned by an elastic or pneumatic tire, and thereby enable a vehicle to run as smoothly with the attachment as without.

Another object of the invention is to effectually prevent the device from slipping or becoming loose when it strikes the ground and is subjected to the weight of a vehicle and when the tire is partially compressed by such weight.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a side elevation of a wheel provided with an attachment constructed in accordance with this invention. Fig. 2 is a vertical sectional view of the same. Fig. 3 is a detail view of the attachment. Fig. 4 is a detail perspective view of one of the gripping members or shoes. Fig. 5 is a detail view of the tool for stretching the chains.

Like numerals of reference designate corresponding parts in all the figures of the drawings.

1 designates an annular series of approximately U-shaped gripping members or shoes constructed of suitable metal and composed of sides and a curved connecting portion presenting a smooth inner face and adapted to fit the tire 2 of a wheel 3, the sides of the gripping devices or shoes being located beyond and spaced from the metallic rim of the wheel to avoid scratching or otherwise marring the finish of the same. The approximately U-shaped gripping devices or shoes are provided with ribs 4, disposed transversely of the tire of the wheel and extending longitudinally of the gripping members or shoes and arranged on the exterior of the same, as clearly shown in Fig. 4 of the drawings. These ribs 4 are adapted to be embedded in the ground, and they are capable of positively engaging the same and are adapted to prevent a wheel from slipping when an automobile or other horseless vehicle is traveling over slippery roads or ascending or descending steep inclines. The device will also be found effective when an automobile is used on snow or ice. The sides of the gripping members or shoes extend inward beyond the metallic rim 5 of the wheel and are provided with eyes 6, which receive links of chains 7, located at opposite sides of the wheel within the rim of the same and connecting the annular series of exteriorly-arranged gripping members or shoes. The ribs 4 terminate short of the ends of the sides and are located equidistant of the side edges of the gripping members or shoes; but instead of employing ribs any other suitable means may be employed for preventing the gripping members or shoes from slipping. The eyes, which may be constructed in any desired manner, are preferably formed integral with the sides by extending and rolling portions thereof, as indicated in Fig. 4 of the drawings. These eyes are preferably arranged in pairs, as shown; but any other desired arrangement may be employed. The chains, which form flexible connections between the annular series of gripping devices or shoes, are provided at one end with snap-hooks 8 or other suitable means for connecting the ends of the chains, and the other end of each chain is provided with a coiled spring 9, terminating in a hook 10, adapted to engage a link for preventing the loose end of a chain from rattling. The chains may be stretched to any desired tension by means of a lever 11, provided with a pivoted arm 12. The pivoted arm 12 is provided at its outer end with an engaging portion or hook and is located adjacent to one end of the lever, which is also provided with an engaging portion or hook. These engaging portions or hooks are adapted to engage links of the end portions of the chains, and said end portions may be readily drawn together by oscillating the lever. The chains are located at opposite sides of the wheel, and when placed under tension the gripping members or shoes are partially embedded or seated in the rim of the wheel, and when one of the gripping members or shoes comes in contact with the ground and is subjected to the weight of the vehicle the other gripping devices are automatically expanded by the tire, whereby any slack or looseness of the device incident to the compression of the tire at the bottom of the wheel will be taken up and the bottom gripping member or shoe prevented from slipping. Also as the gripping members or shoes are partially depressed or embedded in the tire shoulders are formed at opposite sides of them, and they are prevented from slipping on the wheel. The said springs are provided at their inner ends with eyes to receive the adjacent links, and when distended they are adapted to hold the loose ends of the chains securely in place, and they effectually prevent the same from rattling.

It will be seen that the device is exceedingly simple and inexpensive in construction, that owing to the flexible character of the connection between the gripping members or shoes it is adapted to be compactly carried when not in use, and that it is capable of being quickly applied to and removed from a wheel. Furthermore, it will be seen that the device does not come in contact with the metallic rim of a wheel and that there is no liability of scratching or otherwise marring the finish of a wheel and that the gripping members are supported solely by the elastic tire and are thereby cushioned, so as not to interfere with the cushioning action of the tires. Also it will be apparent that the gripping members or shoes are partially seated or embedded in the elastic tire of a wheel and that they are thereby prevented from slipping along the same and that they are automatically expansible to take up any slack in the device occasioned by the compression of the tire at the bottom of the wheel while one of the engaging members or shoes is in contact with the ground.

Instead of connecting the gripping members or shoes by chains, as illustrated in the accompanying drawings, any other suitable means may be employed which will permit the tightening or compensating action of the annular series to prevent a gripping member or shoe from being loosened when in contact with the ground and while the tire is compressed by the weight of a vehicle.

The gripping members or shoes, which are in the form of clips and which may be constructed of any suitable material, are rigid, and the strength and rigidity of the bottom and sides are increased by the longitudinal rib 4, whereby the sides are effectually prevented from spreading or collapsing. By this construction there is no liability of the chains or other flexible connections becoming accidentally slackened by any collapsing or yielding of the sides and bottom of the gripping members.

Having thus fully described my invention, what I claim as new, and desire to secure by Letters Patent, is—

1. A device of the class described, comprising a plurality of gripping members arranged transversely of the tire of a wheel, and chains connecting all the members to each other, said chains being located within the rim of the wheel between the same and the hub, substantially as described.

2. In a device of the class described, a metallic gripping member or shoe provided with a curved inner face to fit the tread of a tire and extending inward beyond the rim, and means for holding it in position on a tire, substantially as described.

3. In a device of the class described, an approximately U-shaped metallic gripping member or shoe having a curved inner face to fit the tread of a pneumatic or cushioned tire the sides of the gripping member or shoe being extended inward beyond the rim, and means for holding the gripping member or shoe in position on the tire of a wheel, substantially as described.

4. In a device of the class described, a gripping member or shoe having a curved inner face to fit the tread of a tire and provided with an exterior projecting rib curved transversely of the tire, said member or shoe being extended inward beyond the rim, and means for retaining the gripping member or shoe on the tire, substantially as described.

5. A device of the class described comprising a plurality of metallic gripping members or shoes arranged on the tread of a tire and extending inward beyond the rim, and means for holding the gripping members or shoes in position and for partially embedding them in the tire to prevent slipping and to cause the device to expand automatically to prevent the bottom gripping member or shoe from being loosened by the compression of the tire, substantially as described.

6. A device of the class described comprising an annular series of metallic gripping members or shoes arranged to be seated on the tread of a pneumatic or cushioned tire and extending inward beyond the rim, and means for connecting the gripping members or shoes and for permitting the same to expand automatically, substantially as described.

7. A device of the class described comprising a plurality of metallic gripping members or shoes arranged to fit the tread of a pneumatic or cushioned tire of a wheel and extending inward beyond the rim, and means located at opposite sides of a wheel and out of contact with the same for connecting the gripping members or shoes, substantially as described.

8. A device of the class described comprising a series of approximately U-shaped gripping members or shoes adapted to be seated on the tread of a pneumatic tire, and flexible connections located at opposite sides of the gripping members or shoes and adjustably connecting the same, substantially as described.

9. A device of the class described comprising an annular series of approximately U-shaped gripping members or shoes, and chains connecting the sides of the gripping members or shoes and provided at their terminals with means for engaging the links to vary the length of the chains, substantially as described.

10. A device of the class described comprising a series of gripping members or shoes, chains connecting the same, means located at one end of each chain for engaging the links, and elastic devices located at the other ends of the chains and provided with means for engaging the links to prevent the loose links from rattling, substantially as described.

11. A device of the class described comprising metallic gripping members or shoes provided at opposite sides with eyes and adapted to be seated on the tread of a tire, said sides being extended inward beyond the rim, and chains connecting the gripping members or shoes and linked into the eyes, substantially as described.

12. A device of the class described comprising a plurality of metallic gripping members seated on and wholly supported by a tire and extending inward beyond the rim, and means for retaining the gripping members on the tire, said means being attached to the gripping members at points between the rim and hub of the wheel and disposed out of contact with the same, substantially as described.

13. In a device of the class described, an approximately U-shaped gripping member or shoe consisting of sides and a connecting portion and adapted to be seated on a tire, and provided with a rib disposed transversely of the tire and extending longitudinally of the gripping member or shoe at the exterior thereof, said rib being arranged on the sides and connecting portion of the same and means for retaining the gripping member or shoe on the tire, substantially as described.

14. A device of the class described comprising a plurality of gripping members adapted to be seated on the tire of a wheel, and chains connecting the gripping members and located within the rim of the wheel between the same and the hub, substantially as described.

In testimony that I claim the foregoing as my own I have hereto affixed my signature in the presence of two witnesses.

STEPHEN E. BURKE.

Witnesses:
J. F. Coss,
J. M. Toner.